United States Patent [19]
Anderson

[11] Patent Number: 5,072,300
[45] Date of Patent: Dec. 10, 1991

[54] BEAM SCAN VELOCITY MODULATION APPARATUS WITH DISABLING CIRCUIT

[75] Inventor: Mark R. Anderson, Indianapolis, Ind.

[73] Assignee: Thomson Consumer Electronics, Inc., Indianapolis, Ind.

[21] Appl. No.: 562,006

[22] Filed: Aug. 2, 1990

[51] Int. Cl.[5] .................. H04N 5/68; H04N 9/64; H04N 9/24; H04N 5/208
[52] U.S. Cl. .................. 358/242; 358/37; 358/64; 358/67; 358/166
[58] Field of Search .................. 358/242, 37, 64, 183, 358/67, 166

[56] References Cited
U.S. PATENT DOCUMENTS

| | | | |
|---|---|---|---|
| 3,893,165 | 7/1975 | Sunstein | 358/67 |
| 4,080,628 | 3/1978 | Tirka | 358/166 |
| 4,170,785 | 10/1979 | Yoshida et al. | 358/242 |
| 4,183,064 | 1/1980 | Sahara et al. | 358/242 |
| 4,185,301 | 1/1980 | Mitsuda et al. | 358/242 |
| 4,251,832 | 2/1981 | Isono | 358/67 |
| 4,261,014 | 4/1981 | Lee | 358/166 |
| 4,309,725 | 1/1982 | Groeneweg | 358/242 |
| 4,641,195 | 2/1987 | Inoue | 358/242 |

FOREIGN PATENT DOCUMENTS
53-49304 11/1978 Japan.

OTHER PUBLICATIONS
Schematic of SVM Circuitry for Toshiba Color Television Receiver Model No. 30ID1, Published in the Magazine "Gijutsu", Oct. 1988 Issue p. 301.
Article from "Best of the Expander, vol. II", entitled "Scan Velocity Modulation—Making it Crisp Around the Edges!", 1988, pp. 74–79.

*Primary Examiner*—John K. Peng
*Attorney, Agent, or Firm*—Joseph S. Tripoli; Joseph J. Laks

[57] ABSTRACT

In a television receiver, employing both a beam scan velocity modulation (SVM) system and an on screen display (OSD) generator, the OSD generator selectively operates to produce characters or graphics which are superimposed on the main video picture display During operation of the OSD generator, the SVM circuit may tend to undesirably introduce artifacts into the picture display. Circuitry is provided for selectively disabling normal SVM circuit operation during OSD operation to prevent or reduce the perception of such artifacts.

13 Claims, 3 Drawing Sheets

BEAM SCAN VELOCITY MODULATION APPARATUS WITH DISABLING CIRCUIT

The invention relates to beam scan velocity modulation (SVM) systems employed for picture sharpness enhancement.

It is well known that an improvement in apparent picture resolution can be achieved by the use of modulation of the beam scan velocity in accordance with the derivative of the video signal which controls the beam intensity. This video signal is known as the luminance signal and the derivative of the luminance signal is employed for beam scan velocity modulation (SVM). Beam scan velocity modulation will improve the picture sharpness in a color television system employing a color kinescope.

Many modern color television receivers also employ alternate video sources. An example of such an alternate video source is commonly referred to as an On Screen Display (OSD) generator. The function of the OSD generator is to provide additional display information to a viewer while viewing a typical television program. Thus OSD generators provides for the display on the television screen of the time of day, channel number, and various control information.

In implementing OSD display, the OSD information is presented together with the normal picture. For example, as illustrated in FIG. 2, the television screen may display the word "MUTE", which word display is generated by the OSD generator. This indicates to the user that the sound associated with the television picture is turned off.

Techniques for generating this type of graphical data which is superimposed upon the television picture are well known. Such techniques include OSD generators which count television lines and insert at the correct pixel locations the proper graphics to display the time of day, the channel number, words such as "CONTRAST", "COLOR", "MUTE", and so on. The use of an on screen display and an associated OSD generator requires the substitution of a different video signal or kinescope drive for the normal video signal which is being processed by the television receiver. In this manner the pertinent information can be superimposed upon the viewed image.

A problem may occur in regard to scan velocity modulation in television receivers which also include an alternate video source such as on screen display generator. As is known, the SVM apparatus operates to modulate the horizontal beam scan velocity in response to differentiated luminance information from the main video source. This modulation may occur prior to OSD deletion of the main luminance signal and insertion of the character signal. In this arrangement, the OSD signal path to the kinescope or display device may bypass the SVM apparatus. As a result, a ghost image representative of the deleted portions of the main luminance signal may appear on the television screen near or behind the inserted OSD character information. Since the horizontal scan is being modulated by the SVM coil in accordance with the differential luminance signal, e.g. in accordance with luminance edges, the ghost image behind the characters generated by the OSD display appears as an outline of the picture contained in the deleted portions of the main luminance signal.

It is therefore desirable to eliminate the above-noted interference and to substantially decrease the effect of SVM artifact generation during the operation of an OSD generator in a television receiver.

A scan modulating circuit modulates the picture displayed on a display device in accordance with the video content of a first video signal. An alternate video signal has its picture information displayed on the display device when the alternate video signal is selected. Operation of the scan modulation circuit is, however, modified in accordance with this selection.

Figure 1:
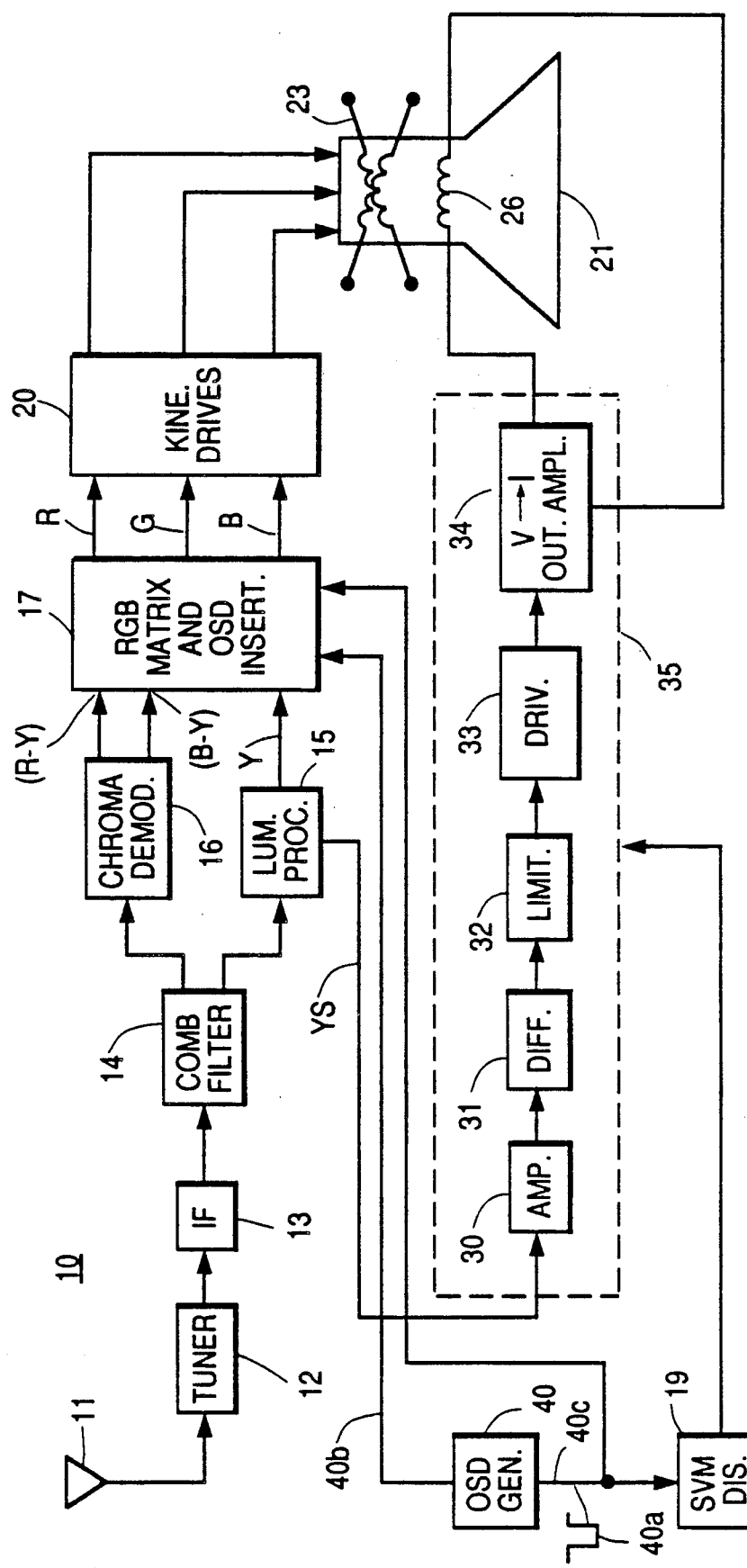
FIG. 1 is a block diagram circuit of a color television receiver employing beam scan velocity modulation according to the invention.

In the color television receiver 10 of FIG. 1, an antenna 11 is conventionally coupled to a tuner 12. The output of tuner 12 is applied to an IF stage 13. The output of IF stage 13 is directed to the input of a comb filter 14. Filter 14 provides one output which is directed to the input of a luminance processor 15 for processing the luminance signal and another output which is directed to a chroma demodulator 16. Luminance processor 15 is a conventional circuit and responds to the luminance signal contained in the composite color video signal developed at the output of IF stage 13. Chroma demodulator 16 provides the color difference signals such as the R-Y and the B-Y signals.

The luminance signal Y from the output of luminance processor 15 and the color difference signals from the output of chroma demodulator 16 are applied to a stage 17. Stage 17 is designated as an RGB matrix and OSD insertion stage. Stage 17 receives the color difference signals, and the luminance signal and, in one mode, operates strictly as an RGB matrix. In this mode, the matrix conventionally processes the color difference signals with the luminance signal to provide the red (R), green (G), and blue (B) signals. The R, G, B, signals are applied to a kinescope driver circuit 20, which circuit drives a color kinescope 21 associated with a conventional color television.

Located on the neck of kinescope 21 is a main deflection yoke 23 comprising respective horizontal and vertical deflection windings, each of which are subjected to energization by respective horizontal and vertical deflection circuits (not illustrated) to develop a raster of scanning lines on the viewing screen of the kinescope 21. Supplemental deflection of the respective beams in the kinescope is supplied by an auxiliary deflection coil 26 which operates to provide scan velocity modulation. SVM Coil 26 may be a single coil or a coil having multiple windings. In any event, one can provide scan velocity modulation by other means such as by deflector plates using electrostatic deflection instead of magnetic deflection. Energization of SVM coil 26 is provided by a scan velocity modulation stage 35, to be further described.

A luminance video signal YS is generated by luminance processor 15 and is indicative of the wideband luminance signal Y that is applied to matrix stage 17. Luminance video signal YS is applied to an input buffer amplifier 30 of SVM stage 35. The output of amplifier 30 is coupled to the input of a differentiator circuit 31, whereby the amplified video signal is differentiated. The differentiated video signal is then applied to the input of a limiter or limiting amplifier 32. The limiter operates to limit excursions of the differentiated video signal in both the positive and negative directions in regard to normal operation. The output of limiting amplifier 32 is applied to the input of a driver amplifier 33 which serves to further process the signal, e.g. to provide noise coring. The output of driver amplifier 33 is coupled to the input of an output power amplifier 34 for converting the input voltage to the power amplifier into an output current. This current is proportional to the magnitude of the differentiated video signal and is used to drive SVM coil 26.

SVM stage 35 has a signal delay characteristic matched to that of the luminance signal being processed by stages 15, 17 and 20. In this way, correctly timed edge enhancement of the displayed picture can be obtained.

As previously indicated, many modern television receivers are capable of OSD operation. In regard to OSD operation, such receivers include an OSD generator 40. The OSD generator may include a horizontal line counter and be responsive to the vertical sync signal to enable text or graphics to be selectively superimposed upon the image displayed on the kinescope screen. To superimpose the OSD information, an output of OSD generator 40 is coupled via a signal line 40b to RGB matrix and OSD insertion stage 17. Switching signals on this line enable RGB matrix stage 17 to delete the original picture information drive signals and substitute OSD character drive signals.

SVM stage 35 operates in conjunction with the differentiated luminance signal from the main signal source and thus operates even though the signal being applied to kinescope 21 is partly derived from an alternate signal source such as OSD generator 40. During operation of the OSD generator, the OSD signal path to the kinescope or display device bypasses the SVM circuitry. This may result in the previously described visually undesirable artifacts appearing on the television screen.

Figure 2:
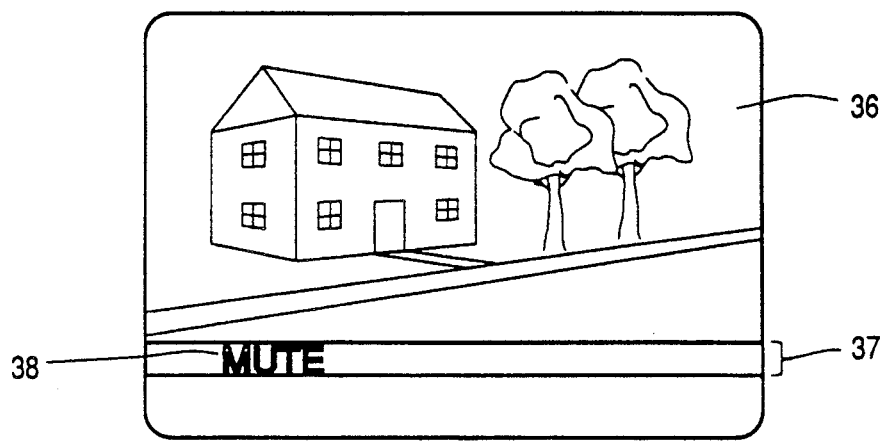
FIG. 2 is a diagrammatic view depicting a video display useful in explaining the operation of the circuit of FIG. 1.

In order to further understand the nature of the interaction between OSD generation and SVM operation, reference is made to FIG. 2, which depicts a typical television scene 36, whereby an OSD generator operates to produce the word "MUTE". The word "MUTE" appears on the screen in any type of graphic format as depicted by reference number 38. It is noted that the word "MUTE" is generated by the OSD generator during a given number of selected horizontal lines 37 and therefore can be of any size or shape and at any location on the screen. Ghost images of scene 36 could appear behind or near the display of the word "MUTE", since SVM stage 35 responds to the deleted luminance information rather than to the generated character information.

To eliminate this effect, in accordance with an aspect of the invention, SVM stage 35 is selectively disabled from normal operation during OSD character generation or during picture display intervals associated with an alternate video source. As shown in FIG. 1, an output signal line 40c from OSD generator 40 is coupled to SVM stage 35 to alter SVM operation during OSD generation and substantially reduce the appearance of visual artifacts during OSD operation.

Figure 3:
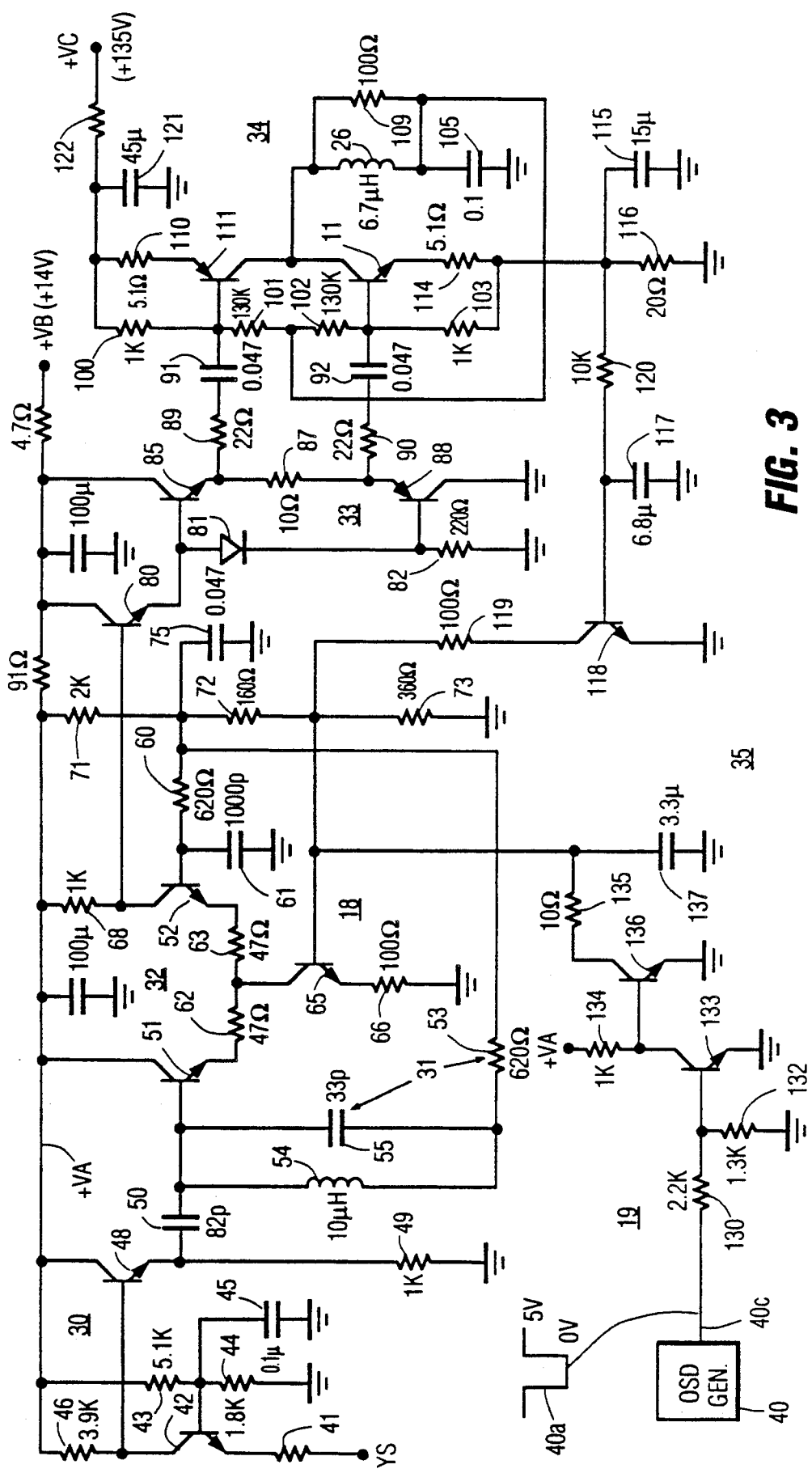
FIG. 3 is a detailed circuit diagram of the beam scan velocity modulation and disabling apparatus of FIG. 1 embodying the invention.

FIG. 3 illustrates a portion of the circuitry of FIG. 1, including a detailed embodiment of SVM stage 35. In FIG. 3, luminance video signal YS is applied via a resistor 41 to the emitter electrode of a transistor 42 arranged in a common base configuration. Base biasing for the common base transistor is obtained by a voltage divider comprising resistors 43 and 44 coupled between a source of operating potential +VA and ground. A bypass capacitor 45 is coupled between ground and the base electrode of transistor 42. The collector electrode of transistor 42 is directed through a load resistor 46 to the source of operating potential +VA. The collector electrode of transistor 42 is also coupled to the base electrode of a transistor 48 arranged in an emitter follower configuration. The collector electrode of transistor 48 is coupled to the source of operating potential +VA, and the emitter electrode is directed to ground via a resistor 49. The emitter electrode is also AC coupled via a capacitor 50 to the base electrode of a transistor 51. Transistorr 51 is part of the differential limiting amplifier 32 of FIG. 1.

The base of transistor 51 is coupled to a tank circuit comprising an inductor 54 in shunt with a capacitor 55. The tank circuit operates to provide a flattened group delay in regard to operation of differentiator 31 so as to compensate for the characteristic of the differentiator, thereby linearizing the differentiated output with regard to high frequency operation. Differentiator 31 comprises capacitor 55 and a resistor 53. Resistor 53 has one terminal coupled to a terminal of the tank circuit remote form the base of transistor 51 and another terminal coupled to the junction between resistors 71 and 72 of a voltage divider comprising resistors 71, 72 and 73. The voltage divider establishes the bias point of the differential limiting amplifier.

Differential limiting amplifier 32, includes transistor 51 and a transistor 52. Transistor 51 has a collector electrode directly coupled to the source of operating potential +VA and an emitter electrode coupled via a resistor 62 to a controllable current source 18, at the collector electrode of a transistor 65. Transistor 65 has the emitter electrode coupled through a resistor 66 to ground. In a similar manner transistor 52, has its emitter electrode coupled to the collector electrode of constant current source transistor 65 via a resistor 63. Resistors 62 and 63 may be equal in magnitude. The collector electrode of transistor 52 is coupled to the source of operating potential +VA via a collector load resistor 68. The collector electrode of transistor 52 provides the output of limiting amplifier 32. The base electrode of transistor 52 is coupled to the junction between resistors 71 and 72 via a resistor 60. The base electrode of transistor 52 is coupled to ground by a capacitor 61 which operates as a bypass for high frequency signal components. DC biasing for transistor 51 is obtained via the connection of resistor 53. Resistor 60 and resistor 53 are of the same magnitude to enable transistors 51 and 52 to receive equal DC biasing. The base electrode of current source transistor 65 is coupled to the junction between voltage dividing resistors 72 and 73 and is also coupled to the collector electrode of a control transistor 118, for controlling the current through limiting amplifier 32. This control varies the peak-to-peak output signal of the limiter, as will be further explained, and also provides double ended limiting.

The collector electrode of transistor 52 is directly coupled to the base electrode of an emitter follower transistor 80. The collector electrode of transistor 80 is coupled to a source of operation potential +VB, and the output emitter electrode is coupled to a driver stage 33.

Driver stage 33 comprises complementary type transistors 85 and 88, with the base of transistor 85 being directly coupled to the emitter of transistor 80 and with the base of transistor 88 being coupled to the emitter of transistor 80 via a diode 81. Diode 81 is directly coupled between the bases of the two driver transistors. A resistor 87 is coupled between the emitters of transistors 85 and 88, and a resistor 82 is coupled between the base of transistor 88 and ground. Transistors 85 and 88 form a Class B amplifier which operates to drive output stage 34. The Class B amplifier also provides a low level, noise coring function.

The emitter electrodes of transistors 85 and 88 in Class B driver stage 33 are AC coupled to the respective base electrodes of complementary type transistors 111 and 113 of output stage 34. To provide the AC coupling, the emitter electrodes of transistors 85 and 88 are coupled through respective resistors 89 and 90 in series with respective capacitors 91 and 92.

The emitter electrode of transistor 111 is directed through a resistor 110 to a source of operating potential +VC. A resistor 122 and a capacitor 121 provide current limiting and supply filtering. The source of operating potential +VC is a DC source of relatively high magnitude, as for example, 135 volts, compared to the source of potential +VB, as for example, 14 volts. This enables output amplifier stage 34 to supply high frequency current to SVM coil 26.

The collector electrode of transistor 111 is coupled to the collector electrode of transistor 113, thereby forming a Class B output stage. Biasing for the output stage transistors is obtained from a voltage divider comprising resistors 100, 101, 102, and 103. The emitter electrode of transistor 113 is coupled to ground via a resistor 114 and a current sampling resistor 116. Resistor 116 is shunted by means of a filter capacitor 115. The time constant for the RC filter of resistor 116 and capacitor 105 is on the order of 20 to 30 horizontal line periods.

One terminal of SVM coil 26 is directed to the junction of the collector electrodes of transistors 111 and 113, and the other terminal is coupled to a grounded capacitor 105. In this manner, the SVM coil is AC coupled to output stage 34, and no DC current can flow in the coil. A damping resistor 109 is coupled across the SVM coil. DC stabilization is provided by coupling the junction of SVM coil 26 and capacitor 105 to the junction of resistors 101 and 102.

Output stage 34 includes current feedback afforded by resistor 116 to prevent overdissipation in the output stage when luminance signal YS has, on the average, substantial high frequency content. The average current through output stage 34 flows through sampling resistor 116. The filtered voltage developed across resistor 116 is representative of this output current and is coupled to the base electrode of a transistor 118 via a resistor 120. The base electrode of transistor 118 is bypassed to ground through a capacitor 117. The magnitude of capacitor 117 is selected to greatly attenuate any high frequency signals and noise that may be undesirably coupled to transistor 118. The collector electrode of transistor 118 is coupled via a resistor 119 to the junction between voltage dividing resistors 72 and 73, at the base electrode of constant current transistor 65.

An increase in current through output stage 34 due to, for example, an increase in average high frequency content of video signal YS, results in an increase in conduction of transistor 118 and therefore a decrease in current in transistor 65. The decrease in current in transistor 65 results in a decrease in peak-to-peak output response. The result is a decrease in average drive to output stage 34, thereby preventing over dissipation in the output stage.

OSD generator 40 of FIGS. 1 and 3 provides OSD blanking pulses 40a, on a line-by-line basis, to matrix stage 17 during the interval of OSD character generation. These blanking pulses are also coupled to an SVM disabling circuit 19 for selectively disable normal SVM operation during OSD generation.

In FIG. 3, a negative going OSD blanking pulse 40a is applied via a resistor 130 to the base electrode of a transistor 133. A resistor 132 is coupled between ground and the base electrode of transistor 133. The collector electrode of transistor 133 is coupled to the base of an SVM disabling transistor 136. DC base biasing for transistor 136 is obtained from the +VA operating potential via a resistor 134. The collector electrode of transistor 136 is coupled via a resistor 135 to the base electrode of constant current source transistor 65. The base electrode of constant current source transistor 65 is also coupled to ground via a capacitor 137 which, as will be explained, is relatively large in value.

When OSD generator 40 is operative to produce character generation for a given block of horizontal lines, the OSD generator will generate a series of blanking pulses 40a within each line period of the block of lines. These pulses correspond to the OSD insertion points for each line. Any given one of blanking pulses 40a will switch on transistor 136 for the duration of that pulse, rapidly discharging capacitor 137, and diverting base current from transistor 65. The current source for differential amplifier 32 is thereby turned off or substantially reduced in magnitude, depending on the value of resistor 135 in series with the collector of transistor 136. For example, the magnitude of current source 18 may be reduced to the point that the peak to peak output of differential amplifier 32 is reduced by 20$db$ from normal levels. Under certain circumstances, even a reduction of as little as 6$db$ may have beneficial effects.

As a result of the operation of disabling circuit 19, no significant amounts of differentiated video signal is supplied to output stage 34. SVM coil 26 does not become significantly energized during OSD operation, thereby preventing visually disturbing artifacts from appearing on the television screen.

After completion of OSD generation, blanking pulses 40a are no longer being generated, resulting in disabling transistor 136 being turned off. In accordance with a different inventive feature, current source transistor 65 does not immediately become conductive when transistor 136 is turned off. Instead transistor 65 remains in cutoff or near cuttoff for an interval that depends upon the time it takes discharged capacitor 137 to recharge to a level that will forward bias the base-emitter junction of the transistor to normal bias values. The recharging time is a function of the RC time constant associated with capacitor 137 and voltage dividing resistors 71, 72 and 73, as well as the value of operating potential +VA and the base current circuit parameters of transistor 65. By selecting capacitor 137 to be relatively large, a delay equivalent to e.g. 20 or 30 horizontal lines is provided. This results in a relatively slow resumption of normal SVM operation after termination of OSD generation.

The relatively slow resumption of normal SVM operation is advantageous in several respects. For example, when disabling circuit 19 is connected to SVM stage 35 in the manner shown in FIG. 2, differential amplifier 32 becomes disabled when current source transistor 65 becomes disabled. The collector electrode of transistor 52 is then pulled up to the +VA voltage level. This level is then translated by the successive base-emitter junctions in transistors 80 and 85, and coupled to DC blocking capacitors 91 and 92, altering their charge levels.

Assume current source transistor 65 were to resume full conduction immediately upon termination of OSD generation. Then operation of differential amplifier 32 would also resume immediately. Full peak-to-peak amplitude SVM drive would be immediately restored to output amplifier stage 34. However, because of the altered charge levels in capacitors 91 and 92, the wrong DC drive level would be applied to the output amplifier, causing erroneous and undesirable scan velocity modulation of the electron beams. This undesirable modulation is at full AC drive, and would continue until correct charge levels are established in DC blocking capacitors 91 and 92.

It may be possible to avoid the above described undesirable DC transients by the expedient of decreasing the values of capacitors 91 and 92 by, e.g., a factor of 10 or more. This, however, could introduce an undesirable alteration of SVM pulse waveshape due to a resultant inequality in the propagation time of the different component frequencies that constitute the SVM pulse.

By providing capacitor 137, coupled to the base electrode of current source transistor 65, conduction in the transistor slowly increases upon termination of OSD generation. The peak-to-peak SVM drive waveform at the collector electrode transistor 52 slowly increases to normal, full amplitude in a way that tracks the reestablishment of correct charge levels in DC blocking capacitors 91 and 92. This slow turn on of differential amplifier 32 avoids the SVM overdriving conditions that could otherwise occur upon termination of OSD display.

Figure 4:
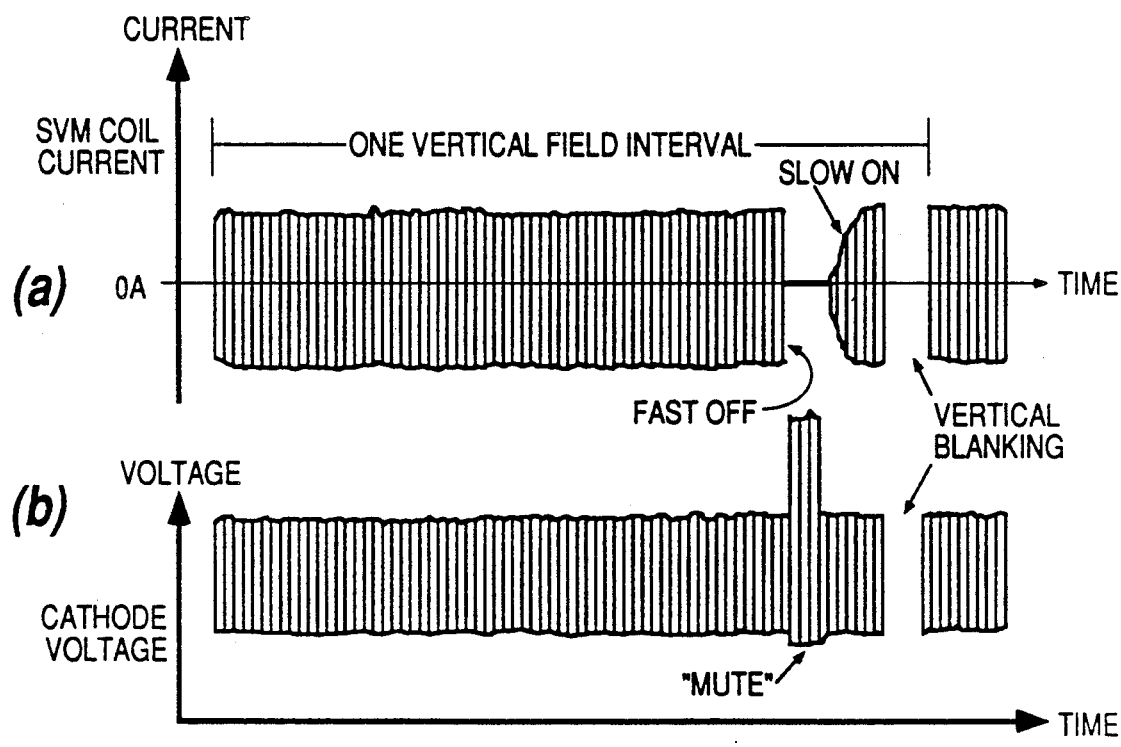
FIGS. 4a and 4b are waveforms useful in explaining the operation of the circuitry depicted in FIG. 3.

Referring to FIG. 4, FIG. 4a depicts on a vertical interval time scale, the envelope waveform of SVM current which flows through coil 26 of FIGS. 1 and 3. FIG. 4b, on the same time scale, depicts the inverted cathode voltage which is applied to any representative one of the kinescope cathodes. The closely spaced vertically oriented lines in the waveforms of FIGS. 4a and 4b schematically represent the higher frequency content of the signals.

In FIG. 4b the term "MUTE" identifies the interval in a given vertical field when the word "MUTE" appears on the television screen. As one can see, the SVM current of FIG. 4a during this interval, is reduced to zero. This reduction is implemented relatively fast (FAST OFF). SVM current returns to normal levels relatively slowly (SLOW ON), after completion of character generation. Capacitor 137, as indicated previously, provides for the slow recovery time, equivalent to, e.g., 20 or 30 horizontal lines.

What is claimed is:

1. Apparatus, comprising:
    a picture display device;
    a source of a first video signal having its picture information displayed on said device when said source is selected;
    a scan modulating circuit coupled to said source for modulating picture information displayed on said device in accordance with the video content of said first video signal;
    an on screen display generator having on-screen display picture information displayed on said device when said generator is selected, said generator producing pulses, on a line-by-line basis, indicative of insertion of said picture information, and
    means responsive to said pulses and coupled to said scan modulation circuit for modifying operation of said circuit when said on screen display generator is selected.

2. Apparatus according to claim 1 wherein said scan modulation circuit includes an auxiliary deflection coil for modulating the scanning of an electron beam in said display device.

3. Apparatus according to claim 1 including means for delaying resumption of unmodified operation of said scan modulation circuit until after said generator is deselected.

4. Apparatus according to claim 1 wherein the signal path for said on screen display picture information to said display device bypasses said scan modulation circuit.

5. Apparatus according to claim 1 wherein said scan modulation circuit includes an amplifier responsive to said first video signal and wherein said modifying means includes a switch responsive to the selection of said generator for disabling normal operation of said amplifier.

6. Apparatus according to claim 5 wherein said amplifier comprises a differential amplifier coupled to a current source, said switch disabling normal operation of said current source.

7. Apparatus according to claim 6 wherein said differential amplifier comprises first and second transistors coupled together and to said current source at a common junction.

8. Apparatus according to claim 5 wherein said scan modulation circuit includes an output stage AC coupled to said amplifier via a DC blocking capacitive arrangement, the disabling of normal amplifier operation altering the charge level condition in said capacitive arrangement.

9. Apparatus according to claim 8 including means for delaying resumption of unmodified operation of said scan modulation circuit until said charge level condition returns to its unaltered state.

10. Apparatus, comprising:
    a picture display device;
    a source of a first video signal having its picture information displayed on said device when said source is selected;
    a scan modulating circuit coupled to said source for modulating picture information displayed on said device in accordance with the video content of said first video signal;
    a source of an alternate video signal having its picture information displayed on said device when said alternate video signal source is selected;
    means responsive to said alternative video signal source and coupled to said scan modulation circuit for modifying operation of said circuit when said alternate video source is selected; and
    means for delaying by a predetermined delay interval resumption of unmodified operation of said scan modulation circuit after said alternate video signal source is deselected.

11. Apparatus according to claim 10 wherein said scan modulation circuit includes an output stage AC coupled to an amplifier via a DC blocking capacitive arrangement, said modifying means disabling normal amplifier operation by altering the charge level condition in said capacitive arrangement.

12. Apparatus according to claim 11 wherein said delay interval includes the time required for said charge level condition to return to its unaltered state.

13. Apparatus, comprising:
a picture display device;
a source of a first video signal having its picture information displayed on said device when said source is selected;
a scan modulating circuit coupled to said source for modulating picture information displayed on said device in accordance with the video content of said first video signal;
a source of an alternate video signal having picture information displayed on said device when said alternate video signal source is selected, said source producing scan synchronized pulses indicative of insertion of said picture information, and
means responsive to said pulses and coupled to said scan modulation circuit for modifying operation thereof.

* * * * *